United States Patent
Ackermann et al.

(10) Patent No.: US 7,594,948 B2
(45) Date of Patent: Sep. 29, 2009

(54) COVERING MEANS FOR A TOP SLAG, METHOD FOR THE PRODUCTION THEREOF AND USE OF THE COVERING MEANS

(75) Inventors: Andreas Ackermann, Munich (DE); Wolfgang Koslowski, Munich (DE)

(73) Assignee: Refratechnik Holding GmbH, Ismaning (DE)

( * ) Notice: Subject to any disclaimer, the term of this patent is extended or adjusted under 35 U.S.C. 154(b) by 302 days.

(21) Appl. No.: 10/539,908

(22) PCT Filed: Sep. 29, 2003

(86) PCT No.: PCT/EP03/10807

§ 371 (c)(1),
(2), (4) Date: Apr. 18, 2006

(87) PCT Pub. No.: WO2004/054742

PCT Pub. Date: Jul. 1, 2004

(65) Prior Publication Data

US 2007/0000350 A1    Jan. 4, 2007

(30) Foreign Application Priority Data

Dec. 18, 2002 (DE) .............................. 102 59 335

(51) Int. Cl.
*C21C 7/076* (2006.01)
(52) U.S. Cl. .............................. 75/305; 75/526; 75/579; 75/764; 75/768; 75/769
(58) Field of Classification Search .................. 75/305, 75/526, 579, 764, 768, 769; 262/62
See application file for complete search history.

(56) References Cited

U.S. PATENT DOCUMENTS

| 4,014,684 | A | * | 3/1977 | Jones et al. ..................... 75/309 |
| 4,440,575 | A | * | 4/1984 | Daussan et al. ................ 75/313 |
| RE31,589 | E | * | 5/1984 | Phoenix et al. ................. 75/709 |
| 5,240,492 | A | * | 8/1993 | Phillips et al. .................. 75/305 |
| 5,407,459 | A | * | 4/1995 | Breault et al. .................. 75/303 |
| 6,342,088 | B1 | * | 1/2002 | Klatt et al. ..................... 75/300 |

FOREIGN PATENT DOCUMENTS

| DE | 37 27 619 | | 11/1988 |
| DE | 37 42 415 | | 12/1988 |
| DE | 38 23 410 | | 5/1989 |
| DE | 42 30 161 | | 3/1994 |
| DE | 197 28 368 | | 3/1999 |
| DE | 101 24 926 | | 11/2002 |
| JP | 57-57824 | | 4/1982 |
| JP | 1-237049 | | 9/1989 |
| JP | 07214287 A | * | 8/1995 |
| JP | 10-258343 | | 9/1998 |
| JP | 11278916 A | * | 10/1999 |

\* cited by examiner

*Primary Examiner*—George Wyszomierski
*Assistant Examiner*—Tima M McGuthry-Banks
(74) *Attorney, Agent, or Firm*—Brinks Hofer Gilson & Lione

(57) ABSTRACT

The invention relates to a covering agent for a top slag of a metallic melt bath in a metallurgical vessel, in particular used in the steel industry, containing a material which melts on the melt bath and performs metallurgical work, wherein the material substantially comprises granules which have been rendered porous and the porosity of which is such that, at the melt bath temperature, a molten layer of liquid slag is formed on the melt bath, and a thermal barrier layer of the granules is formed above the molten layer of liquid slag. In addition, the invention relates to a process for producing the covering agent and to its use.

29 Claims, No Drawings

US 7,594,948 B2

COVERING MEANS FOR A TOP SLAG, METHOD FOR THE PRODUCTION THEREOF AND USE OF THE COVERING MEANS

CROSS REFERENCE TO RELATED APPLICATION

This application claims priority to PCT/EP03/10807, filed Sep. 29, 2003 and DE 102 59 335.3, filed Dec. 18, 2002.

FIELD OF THE INVENTION

The invention relates to a covering agent or a covering material for covering the exposed surface of a metal melt bath in an open metallurgical vessel, in particular in steel making in the pig iron and secondary metallurgy sector and the continuous casting thereof, in order to form a top slag. Moreover, the invention relates to the use of such a covering agent.

BACKGROUND OF THE INVENTION

The melt bath in open metallurgical vessels used in the steel industry, for example in continuous-casting tundishes, is usually covered with a covering agent or covering material which melts and forms what is known as the top slag. The top slag ensures a liquid protective layer on the metal bath surface, which is intended to maintain the oxidic purity level and prevents gases from being taken up out of the atmosphere and absorbing non-metallic inclusions from the melt.

Top slag agents for covering a melt bath generally have a melting point that is typically 150° C. below the liquidus temperature of the melt, so that they melt a short time after being applied.

The composition of the top slag depends on the requirements of the metallic melt bath. For steel making, it is mostly basic covering agents based on calcium aluminate, e.g. $C_{12}A_7$ (12 CaO.7 $Al_2O_3$) that are used. These may, for example, be mixtures or melt products from an $Al_2O_3$ carrier, such as bauxite or alumina, and a CaO carrier, such as limestone, calcined lime or dolomite. However, it is also possible, for example, to use continuous-casting powders as a mixture of $SiO_2$, CaO, $Al_2O_3$, fluorine or soda components or vanadium slag-forming agents.

The liquid slag layer dissipates large quantities of heat outward from the melt bath and therefore causes high heat losses. To prevent this, a thermal barrier agent is applied as a coating to the slag. The thermal barrier agents should not melt at the melt bath and slag melt temperatures and should be sufficiently inert or nonreactive for them not to participate in the metallurgical process. By way of example, one thermal barrier agent used is biogenic silica in the form of rice husk ash. Furthermore, granulated spray-dried granules which are in the form of hollow minispheres are used.

In practice, the metal melt is generally first of all covered with the top slag agent; then, the thermal barrier agent is added to the molten top slag. The combination of top slag plus thermal barrier agent is also known as a "sandwich covering".

One drawback of this known sandwich covering method with thermal barrier is that two different agents have to be used. Two products have to be kept in stock, and it must be ensured that they are not used in the wrong order on site. Another drawback is that reactions still occur between the dry, more solid thermal barrier agent and the liquid top slag, and these reactions have an adverse effect on the metallurgical effect of the top slag. By way of example, $SiO_2$ from the rice husk ash can be taken up by the top slag until the saturation limit is reached, with the result that the top slag releases oxygen to the metal melt, something which the top slag is actually supposed to prevent.

Melts in metallurgical casting ladles are often also covered with thermal barrier agents. The melt bath surface of a casting ladle is covered with the thermal barrier material, for example at the end of the metallurgical work, thereby reducing the thermal losses.

In some cases, a thermal insulation is even applied before the metallurgical work has ended, for example if relatively long transfer or standing times are intended from tapping to the next treatment stage. In this case, the thermally insulating covering may have to be removed again by slag removal prior to the next treatment stage, since it would impede the subsequent metallurgical work of a top slag applied subsequently. This measure requires additional outlay, and considerable delays the metallurgical work and leads to not inconsiderable losses of material in terms of the thermal barrier agent.

It is an object of the invention to ensure good metallurgical work by a covering agent for a metallurgical melt bath and simpler thermal insulation.

DESCRIPTION OF THE INVENTION

The invention relates to a covering agent in granular or grain form, the melt of which has a chemical and mineralogical composition required for the metallurgical work, and which forms both the slag melt and, above it, as a result of the granules being rendered suitably porous, a thermal barrier layer on a metallic melt bath.

Consequently, the top slag material according to the invention has the synergistic function of also acting as a thermal barrier agent by virtue of the granules having a suitable thermally insulating porosity as a result of having been rendered porous.

If the slag material which has been rendered porous in accordance with the invention is applied to the metallic melt bath, a predetermined part of the material of the coating, which is in direct contact with the melt bath surface and forms a molten layer of slag, melts. Above this is dry, solid slag material which has been rendered porous in a loose bulk bed, while both slag melt and slag material that has been rendered porous are present in a transition region. The thermal barrier results substantially from the grain porosity and the spaces between the grains of the top slag material (intergrain volume) of the bulk bed.

The quantity of top slag material to be applied depends on the metallurgical work required and on the desired thermal insulation.

One particular further synergistic effect of the top slag material according to the invention results from it being possible for elements or substances of the top slag melt which are consumed by the metallurgical work automatically to be topped up from the transition region material and/or the material of the thermal barrier layer above.

If the levels of a certain constituent in the slag melt become depleted, a concentration drop results, and this is compensated for by the constituent being topped up from the unmelted material. This automatically produces optimum conditions for the metallurgical work in the long term.

The invention is therefore taking a completely new route to ensuring the thermal insulation which, moreover, results in a surprisingly large number of benefits. By way of example, there is no longer any problem with filled casting ladle which have to hold for relatively long periods of time only being provided with a thermally insulating covering of the top slag material according to the invention, without significant quantities of liquid slag being produced. Only at a later stage is the thermal barrier material melted to form the top slag for the metallurgical work. This eliminates the need to remove thermal barrier agents prior to the metallurgical work, as was hitherto necessary.

The top slag material which has been rendered porous in accordance with the invention can be produced, for example, by using at least one starting material which releases gaseous substances and thereby produces pores during dewatering or calcining reactions. It is preferable for milled top slag raw materials, for example top slag raw materials which have been milled to <90 µm, to be mixed with a binder which is burnt out at relatively low temperatures and allows bodies of a defined grain size to be produced from the mixture in a pelletizing or granulating device, e.g. on a granulating plate or in a granulating drum. The bodies or pellets or granules are heat-treated in such a manner that the binder is burnt out, the raw materials are dewatered and/or calcined and ceramic bonding and/or sintered bonding is produced. After cooling, solid pellets or granules with pores which have been introduced by dewatering and/or burning out and/or calcining are obtained.

Binders which are preferably used include water, water glass, synthetic resins, sulfite waste liquor, phosphate compounds and/or calcined lime.

According to one particular embodiment of the invention, organic combustibles which produce porosity by being burnt out are added to render the binder/raw material mixtures porous. These agents for rendering the mixture porous, such as paper fibers, sawing chips, sawdust, wood chips, styropor granules or the like, are used in particular if the starting raw materials produce few if any pores when they are burnt.

Of course, the binders which are burnt out also produce additional pores, so that the level of pores can be controlled by the addition of binder, the choice of starting materials which can be dewatered and/or calcined and/or the combustibles.

It is preferable to produce pellets or granules with grain sizes of between 1 and 50 mm, in particular between 3 and 20 mm, in which case it is advantageous, with regard to the grain size distribution, to use grain fractions that are as narrow as possible, so that as much air as possible is present in the grain pockets in the packed bed of grains on a melt bath or on the slag melt, thereby further increasing the thermal insulation.

It is expedient for the pellets or granules in the material in grain form to have a porosity of 5 to 70% by volume, in particular from 20 to 60% by volume.

Preferred bulk densities of the top slag material according to the invention are between 0.2 and 1.6 kg/dm$^3$, in particular between 0.3 and 1.3 kg/dm$^3$.

Basic top slag agents which have been rendered porous for steel making based on calcium aluminates in the following ratio:

$CaO/Al_2O_3$ from 0.25 to 4, in particular from 1.0 to 1.5 are particularly suitable. Up to 15% by mass of auxiliary phases may be present. These auxiliary phases include, for example, MgO and/or $MgOSiO_2$ and/or $TiO_2$ and/or $Fe_2O_3$ and/or alkali metals.

According to a further embodiment of the invention, top slag material according to the invention is produced by adding an expanding agent and water or a foaming agent and water to the raw material mixture, so that the mixture is expanded or foamed, thereby producing pores. Then, the expanded or foamed mixture can be burnt and broken up to the desired grain size after cooling.

As an alternative to a foaming agent, it is also possible for a prefoamed foam to be admixed to the dry mixture or an aqueous mixture.

These production processes likewise allow a predeterminable or controlled porosity to be achieved in a simple way; it is also possible to select a combination of these processes with the production of pores by means of combustibles and calcining.

The production of a top slag product according to the invention is explained in more detail on the basis of the following example.

EXAMPLE

A shapeable mixture with a $CaO/Al_2O_3$ ratio of 1.14 was produced from raw bauxite and limestone flour each having a fineness of <90 µm and water as binder. The quantity of binder was set to be such that it was possible to produce granules with a grain size fraction of between 5 and 20 mm on a granulating plate.

The granules were heated to 1250° C. in such a manner that the binder was burnt out, the bauxite and limestone components were calcined and the calcined grains were ceramically bonded.

The result after cooling was a free-flowing top slag material which was in grain form and had been rendered porous, comprising calcium aluminate in approximately the starting composition in terms of $Al_2O_3$ and CaO and the starting grain fraction, which it was possible to pack down and dispatch.

Once applied to a steel melt bath in a continuous-casting tundish, a molten slag layer, a transition region and a thermally insulating bulk layer were produced on top of one another. The thermal insulation was comparable to that provided by conventional thermal barrier agents. The metallurgical work performed by the slag was likewise excellent and in particular more durable than in the case of the conventional slag of the same sandwich covering. This evidently resulted from materials which had been consumed during the metallurgical work in the slag being topped up from the thermally insulating granules above the slag and from chemical reactions between the top slag and the thermal barrier agent being avoided.

It is within the scope of the invention for top slag material that has not been rendered porous and is known per se to be combined with top slag material according to the invention that has been rendered porous, the two materials as far as possible having an identical or similar, i.e. metallurgically equivalent, composition, by the melt bath first of all being covered with the known top slag material that has not been rendered porous; this material melts very quickly. Then, top slag material according to the invention is applied to the slag melt; this top slag material according to the invention substantially only has a thermally insulating effect and can also be used to top up substances which have been consumed in the slag melt. In this case—as with the "mono-covering" according to the invention as described above—the thermal insulation can be deliberately set by selecting the grain fraction and/or the porosity in the material. This is possible, for example, by combining different grain size fractions and/or different porosities in the material.

While the above description constitutes the preferred embodiment of the present invention, it will be appreciated that the invention is susceptible to modification, variation and change without departing from the proper scope and fair meaning of the accompanying claims.

The invention claimed is:

1. A covering agent for forming a top slag on a steel melting bath, which melts on the melting bath and performs metallurgical work, the covering agent comprising
   a granular material that has been made porous, the grains of which have a porosity of 5 to 70 volume percent; and
   the granular material being calcium aluminate having a ratio of CaO to $Al_2O_3$ between 0.25 to 1.5;
   wherein, the covering agent forms both a slag melt and as a result of the grains being made porous, a thermal insulation layer on the steel bath.

2. The covering agent as claimed in claim 1, in which the granular material has a grain size of between 1 and 50 mm.

3. The covering agent as claimed in claim 1, in which the granular material has a grain size of between 2 and 20 mm.

4. The covering agent as claimed in claim 1, in which the granular material is made up of shaped granules or a pelletized product.

5. The covering agent as claimed in claim 1, in which the granular material is a granulated foam product or an expanded, granulated product.

6. The covering agent as claimed in claim 1, wherein the granular material has a porosity made by dewatering or calcining.

7. The covering agent as claimed in claim 1, wherein the granular material has a porosity made by organic combustibles.

8. The covering agent as claimed in claim 1, wherein the covering agent further comprises up to 15% by mass of auxiliary phases, selected as at least one from the group of MgO, $MgOSiO_2$, $TiO_2$, $Fe_2O_3$, and alkali metals.

9. The covering agent as claimed in claim 1, wherein the calcium aluminate has the following chemical analysis and ratio:

$CaO/Al_2O_3$ from 1.0 to 1.5.

10. The covering agent as claimed in claim 1, wherein the grains of the granular material has a porosity of from 20 to 60% by volume.

11. A process for producing a covering agent for a top slag of a metallic melt bath in a metallurgical vessel of the type used in the steel industry comprising the steps of reacting fine-particle mineral raw materials with one another at high temperatures and are suitable for the top slag are mixed and heated until they react to form a mixture, and further
   a) providing at least one raw material which is capable of being dewatered or calcined so as to release at least one selected from the group of water vapor or gaseous products,
   b) forming the mixture into a shapeable compound using a combustible binder,
   c) shaping the shapeable compound to form material in granular form, and
   d) heating the material in granular form such that the binder is burnt out, generating porosity in the material from 5 to 70 volume percent by dewatering or calcining of the raw material, and then a ceramic bond or a sintered bond is produced between the raw materials.

12. The process as claimed in claim 11, wherein milled raw materials with grain sizes of <90 μm are used.

13. The process as claimed in claim 11, wherein the binder used is one or more selected from the group of water, water glass, synthetic resins, sulfite waste liquor, phosphate compounds and calcined lime.

14. The process as claimed in claim 11 further comprising the step of using the covering agent to form a top slag melt and a thermal barrier layer on the metallic melt bath, as a monolayer coating on the metallic melt bath.

15. The process as claim in claim 11 further comprising the step of using the covering agent to form a thermal barrier layer on the metallic melt bath, as a thermal barrier agent on a metallic bath.

16. A process for producing a covering agent for a top slag of a metallic melt bath in a metallurgical vessel of the type used in the steel industry, comprising the steps of reacting fine-particle mineral raw materials which react with one another at high temperatures and are suitable for the top slag are mixed and heated until they react, and further
   a) mixing the raw materials with water and one or more of the group of a foaming agent, an expanding agent, and a foam, so that pores are introduced into raw materials forming a mixture,
   b) firing the mixture until a ceramic bond or a sintered bond is produced forming a fired product; and
   c) breaking the fired product up into granular materials having a porosity in the range from 5 to 70 volume percent.

17. The process as claimed in claim 16, wherein the fired product is comminuted and classified.

18. The process as claimed claim 16, wherein organic combustibles are added to the mixture in order to render it more porous.

19. The process as claimed in claim 18, wherein one or more of paper fibers, sawdust, sawing chips, wood chips and/or styropor granules are added.

20. The process as claimed in claim 16, wherein the raw materials are selected for producing calcium aluminates.

21. The process as claimed in claim 20, wherein raw materials which ensure the following chemistry and ratio in the mixture:

$CaO/Al_2O_3$ from 0.25 to 4 are used.

22. The process as claimed in claim 20, wherein the raw materials which ensure the following chemistry and ratio in the mixture:

$CaO/Al_2O_3$ from 1.0 to 1.5 are used.

23. The process as claimed in claim 16, wherein the raw materials with a fineness of <90 μm are used.

24. The process as claimed in claim 16, wherein the raw materials which contain up to 15% by mass of auxiliary phases are used.

25. The process as claimed in claim 24, wherein the auxiliary phases are one or more of the group of MgO, $MgOSiO_2$, $TiO_2$, $Fe_2O_3$ and alkali metals.

26. The process as claimed in claim 16, wherein the firing step is carried out at temperatures of up to 1250° C.

27. The process as claimed in claim 16, wherein dewatering or calcining raw materials are used.

28. The process as claimed in claim 16 further comprising the step of using the covering agent to form a top slag melt and a thermal barrier layer on the metallic melt bath, as a monolayer coating on the metal metallic bath.

29. The process as claimed in claim 16 further comprising the step of using the covering agent to form a thermal barrier layer on the metallic melt bath, as a thermal barrier agent on the metallic melt bath.

* * * * *

UNITED STATES PATENT AND TRADEMARK OFFICE
CERTIFICATE OF CORRECTION

PATENT NO. : 7,594,948 B2
APPLICATION NO. : 10/539908
DATED : September 29, 2009
INVENTOR(S) : Andreas Ackermann and Wolfgang Koslowski It is certified that error appears in the above-identified patent and that said Letters Patent is hereby corrected as shown below:

In the Claims

In column 6, Claim 15, line 3, after "as" delete "claim" and insert --claimed--.

In column 6, Claim 18, line 24, after "claimed" insert --in--.

Signed and Sealed this

Nineteenth Day of January, 2010

David J. Kappos
*Director of the United States Patent and Trademark Office*